United States Patent
Quinlan

(10) Patent No.: US 10,546,508 B2
(45) Date of Patent: Jan. 28, 2020

(54) SYSTEM AND METHOD FOR AUTOMATED LITERACY ASSESSMENT

(71) Applicant: Thomas H. Quinlan, Princeton, NJ (US)

(72) Inventor: Thomas H. Quinlan, Princeton, NJ (US)

( * ) Notice: Subject to any disclaimer, the term of this patent is extended or adjusted under 35 U.S.C. 154(b) by 411 days.

(21) Appl. No.: 15/442,862

(22) Filed: Feb. 27, 2017

(65) Prior Publication Data
US 2018/0158359 A1    Jun. 7, 2018

Related U.S. Application Data

(60) Provisional application No. 62/430,380, filed on Dec. 6, 2016.

(51) Int. Cl.
| | | |
|---|---|---|
| G07F 17/00 | (2006.01) | |
| G09B 5/02 | (2006.01) | |
| G06F 3/01 | (2006.01) | |
| G09B 7/02 | (2006.01) | |
| G10L 15/26 | (2006.01) | |

(52) U.S. Cl.
CPC ............... *G09B 5/02* (2013.01); *G06F 3/013* (2013.01); *G09B 7/02* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 2007/0172810 A1 | 7/2007 | McCallum et al. | |
| 2007/0248938 A1* | 10/2007 | Ronald | G09B 5/06 434/178 |
| 2010/0184009 A1* | 7/2010 | Rajkowski | G09B 5/02 434/159 |
| 2011/0010646 A1 | 1/2011 | Usey | |
| 2011/0306023 A1* | 12/2011 | Blank | G09B 7/00 434/178 |

(Continued)

FOREIGN PATENT DOCUMENTS

WO    WO2009049353 A1    4/2009

OTHER PUBLICATIONS

International Search Report and Written Opinion in PCT/US2017/064732, dated Feb. 6, 2018.

*Primary Examiner* — Paul A D'Agostino
(74) *Attorney, Agent, or Firm* — John H. Choi & Associates

(57) ABSTRACT

The present invention relates to a system and method for automatically assessing a user's basic literacy skills. More specifically, the invention relates to a system and method for monitoring, tracking, capturing and analyzing information about a user's reading and writing behavior. An input device receives data involving literacy-related activities of a user. A processor executes a predetermined literacy assessment program for implementing a pre-analysis module which performs pre-analysis of the received data, an analysis module which performs a literacy assessment analysis on the pre-analyzed data and a post-analysis module which performs post-analysis assessment of the results of the literacy assessment analysis. An output device outputs the post-analysis assessment assessing the literacy of the user.

60 Claims, 7 Drawing Sheets

(56) References Cited

U.S. PATENT DOCUMENTS

2014/0234826 A1\* 8/2014 Breznitz ............... G09B 7/00
    434/362
2015/0378997 A1 12/2015 Becker et al.
2016/0203432 A1 7/2016 Shaw et al.

\* cited by examiner

SYSTEM AND METHOD FOR AUTOMATED LITERACY ASSESSMENT

CROSS-REFERENCE TO RELATED APPLICATIONS

This application claims priority to U.S. Provisional Application No. 62/430,380, filed on Dec. 6, 2016, which is incorporated by reference in its entirety.

FIELD OF THE INVENTION

The present invention relates generally to a system and method for automatically assessing a user's basic literacy skills. More specifically, the invention relates to a system and method for monitoring, tracking, capturing and analyzing information about a user's literacy-related behaviors, in order to measure basic reading and writing skills.

BACKGROUND

A primary focus of public education, literacy learning is a foundational aspect of an individual's educational development. Ideally, every student would become a skilled reader and writer. Importantly, literacy skill has become more vital than ever. As our society increasingly relies upon newly developed digital technologies, the use of those technologies often requires fluent literacy skills. To learn these skills, our society provides its children literacy instruction. Literacy instruction typically encompasses a variety of activities, among which assessment is crucial. In the process of literacy learning, feedback on one's performance allows the learner to adjust his/her behavior, so as to improve. However, this feedback requires an accurate assessment of the learner's performance, which may be performed by a skilled teacher. The present invention automates some of this assessment. By improving the assessment of basic literacy skills, the present invention could greatly benefit literacy instruction.

Literacy instruction typically involves a variety of activities, intended to develop the range students' literacy skills, from high-level problem-solving (e.g., literary analyses) to low-level skills (e.g., reading comprehension). The long-running controversy between 'whole language' and 'basic skills' has been largely settled: most experts agree that both approaches are important. Accordingly, educators generally recognize that high-level literacy abilities crucially depend upon fluent low-level skills. The present invention assesses the latter.

Many literacy teachers face the formidable challenge of finding the right balance between high-level and low-level literacy skills. How much instructional time should literacy teachers devote to basic skills? The answer largely depends upon the relative development of students' literacy skills. In U.S. schools, students' literacy skills often encompass a wide range, from the highly literate to the almost illiterate. While assessing basic literacy skills may be important for the former, it is imperative for the latter. For students struggling to master literacy, assessment should monitor the development of basic literacy skills.

Existing methods of student assessment include assignment completion, progress monitoring, and summative assessment. Each category has its advantages, along with significant disadvantages and limitations. To varying extents, all existing methods of literacy assessment are laborious, time-consuming, and/or provide little information to guide instruction.

For literacy teachers, assessment efforts are often limited to assignment completion. Among other benefits, class assignments provide students with relevant practice. Class assignments are closely integrated to the teachers' curriculum, which are typically designed to engage students in intellectually challenging and interesting topics. Unfortunately, as conventionally implemented, class assignments provide teachers with very limited information about the development of students' literacy skills.

Some teachers specifically assess the development of students' literacy skills. For this 'progress monitoring,' several assessments are commercially available (e.g. DIBELS), whether in printed and digital form. When properly administered and scored, these assessments can provide a useful window onto students' literacy skills. Arguably, these assessments are optimal when administered to specific individuals or small groups, whom teachers suspect of having literacy difficulties. However, existing methods of progress monitoring assessment have a few major drawbacks. First, they typically do not integrate well with teacher's curriculum. Second, the test items occupy students in repetitive, relatively simplistic exercises, sometimes referred to as 'drill and kill'. Instead, most language arts teacher prefer assigning activities that engage students in higher level problem-solving. The present invention addresses these drawbacks.

Lastly, most primary and secondary schools administer summative assessments, which provide stakeholders with information about the development of students' literacy skills. From a psychometric perspective, these assessments can provide accurate measurement of students' literacy skills. However, summative assessments also have some serious drawbacks. Existing methods of summative assessment typically: (a) do not integrate into teachers' curriculum and (b) disrupt schools' normal routines and schedule. This measurement typically occurs at a single point in time, typically the end of the academic year—or increasingly, throughout the year! Existing summative assessments suffer from these and other drawbacks; consequently, their ecological validity has often been questioned.

Overall, existing methods of literacy assessment address three different purposes: assignment completion, progress monitoring, and summative evaluation. As a new method of progress monitoring, the present invention addresses the drawbacks of existing methods. Further, when used by teachers, it might also provide benefits for assignment completion and summative evaluation.

SUMMARY OF THE INVENTION

The present invention addresses limitations of existing methods of progress monitoring. More specifically, the present invention automatically assesses the low-level literacy skills of reading fluency and writing fluency, including as the user engages in ordinary online activities. It provides literacy teachers with a new method of progress monitoring, by automatically assessing students' basic literacy skills. Teachers may find this assessment useful in a variety of ways, including to target instruction, identify students with learning difficulties, and/or to predict students' future performance on summative assessments.

Importantly, the present invention analyzes students' literacy behaviors during ordinary activities online, via a networked digital device. For most Americans, the World Wide Web has become an everyday tool. Given that much Web-content is textual, the skills of reading and writing have never been more useful. This textual content affords new assessment possibilities, which the present invention exploits. Those possibilities include measuring literacy skills automatically and unobtrusively. Assessment happens in the background, while students engage in ordinary literacy activities online. These literacy activities may happen in-school (via Learning Management Systems, such as Blackboard or Moodle among others) or out-of-school. If the former, the present invention enables the easy integration of progress monitoring into a teacher's curriculum. Observing students' in multiple contexts, the present invention identifies what a learner can and cannot do.

The present invention addresses the limitations and disadvantages of existing methods of progress monitoring (described above). Instead of utilizing test items, like existing methods, the present invention analyzes users' ordinary literacy behaviors, as the user reads and writes online (via the WWW). By providing accurate information about the development of students' literacy skills, the present invention could prove useful to both teachers and students, allowing each to make informed judgments about their teaching and learning efforts.

With the present invention, all literacy activities online become a potentially rich source of assessment data. Those activities may occur in-school, related to a particular assignment on a LMS, such as Blackboard, or out-of-school. By automatically capturing and analyzing this data, the present invention enables stakeholders to make valid inferences about the development of students' literacy skills.

The present invention assesses the fluency of basic reading and writing skills. It provides useful information about student development, which teachers can use to target instruction. While assessing all students, it can particularly identify those with relatively dysfluent basic literacy skills, those who might benefit from special instruction. By assessing students unobtrusively, progress monitoring does not interfere with teachers' normal curriculum. By automating progress monitoring, it adds little or nothing to teacher workload. Assessment can be readily scaled-up to the whole-class level. And by capturing time on-task, the present invention provides a measure of practice, in terms of the time a student spends on literacy-related activities.

Beyond progress monitoring, the present invention might also serve other assessment purposes. Several studies have found that measures of reading fluency successfully predict performance on reading comprehension tests. Consequently, from this prediction, progress monitoring might be used to reduce the frequency of summative assessments. Also, progress monitoring might be used to increase the value of assignment completion. When integrated into an LMS, every assignment can provide a window onto the development of students' basic literacy skills.

In one embodiment of the present invention, a system provides automated literacy assessment comprising: an input device for receiving data involving literacy-related activities of a user; a processor for executing a predetermined literacy assessment program for implementing: a pre-analysis module for performing pre-analysis of the received data; an analysis module for performing a literacy assessment analysis on the pre-analyzed data; and a post-analysis module for performing post-analysis assessment of the results of the literacy assessment analysis; and an output device for outputting the post-analysis assessment of the user's basic literacy skills.

The input device may include an eye-tracking device for tracking the eye movements of the user during the literacy-related activities; and wherein the processor executes an eye-tracking program to process the tracked eye movements of the user. Alternatively, the input device includes a microphone for receiving audio-based literacy-related activities of the user; and wherein the processor executes a speech-recognition program to process the receiving audio-based literacy-related activities of the user.

The literacy-related activities of the user involve reading and/or writing activities of the user. The processor may be operatively connected to at least one of the input device and the output device by a communication network. The output device may be a display for displaying the post-analysis assessment assessing the literacy of the user.

In another embodiment of the present invention, a method provides automated literacy assessment comprising: receiving, at an input device, data involving literacy-related activities of a user; executing, by a processor, a predetermined literacy assessment program; performing pre-analysis of the received data by a pre-analysis module; performing a literacy assessment analysis on the pre-analyzed data by an analysis module; performing post-analysis assessment of the results of the literacy assessment analysis by a post-analysis module; and outputting, at an output device, the post-analysis assessment assessing the literacy of the user.

The method further includes tracking the eye movements of the user during the literacy-related activities using an eye-tracking device; and processing, using the processor, the tracked eye movements of the user. Alternatively, the method further includes receiving, at a microphone, audio-based literacy-related activities of the user; and performing, using the processor, speech-recognition to process the receiving audio-based literacy-related activities of the user.

The literacy-related activities of the user involve reading and/or writing activities of the user. The method may also include operatively connecting the processor to at least one of the input devices and the output device by a communication network. The method may also including displaying, on a display, the post-analysis assessment assessing the literacy of the user.

In a further embodiment of the present invention, a non-transitory computer readable medium storing instructions, executable by a processor, provides automated literacy assessment, with the stored instructions implementing a method comprising: receiving, at an input device, data involving literacy-related activities of a user; executing, by a processor, a predetermined literacy assessment program; performing pre-analysis of the received data by a pre-analysis module; performing a literacy assessment analysis on the pre-analyzed data by an analysis module; performing post-analysis assessment of the results of the literacy assessment analysis by a post-analysis module; and outputting, at an output device, the post-analysis assessment assessing the literacy of the user.

The computer-readable medium further includes instructions for tracking the eye movements of the user during the literacy-related activities using an eye-tracking device; and processing, using the processor, the tracked eye movements of the user. Alternatively, the computer-readable medium further includes receiving, at a microphone, audio-based literacy-related activities of the user; and performing, using the processor, speech-recognition to process the receiving audio-based literacy-related activities of the user.

The literacy-related activities of the user involve reading and/or writing activities of the user. The computer readable medium may further include instructions for operatively connecting the processor to at least one of the input device and the output device by a communication network.

DETAILED DESCRIPTION

The Present Invention

The present invention relates generally to a system and method for automatically assessing a user's basic literacy skills, as the user engages in ordinary online activities. More specifically, the invention relates to a system and method for monitoring, tracking, capturing and analyzing information about a user's literacy behavior, in order to assess basic reading and writing skills.

Figure 1:
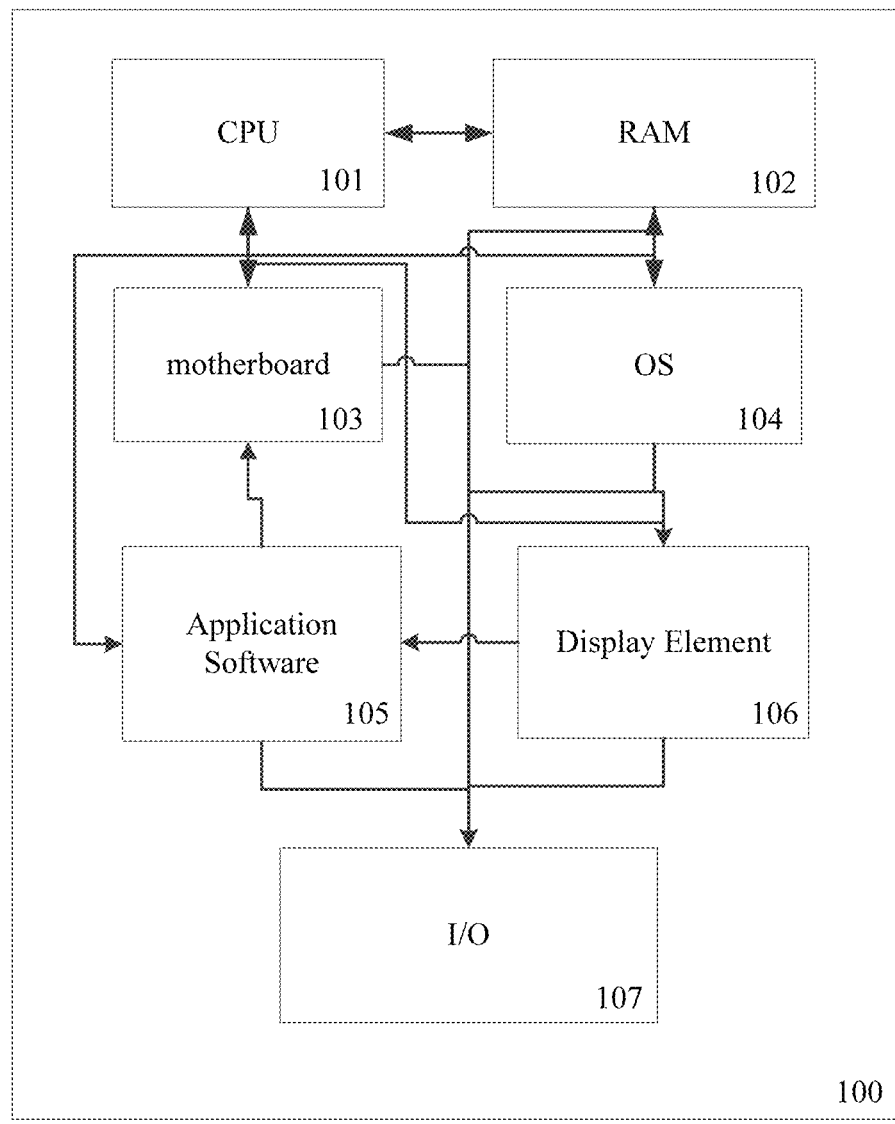
FIG. 1 illustrates a schematic overview of a computing device, in accordance with embodiments of the present invention.

According to an embodiment of the present invention, the system and method may be configured to share with and/or receive data from one or more computing devices. As shown in FIG. 1, one of ordinary skill in the art would appreciate that a computing device 100 appropriate for use with embodiments of the present application may generally be comprised of one or more of the following: a central processing Unit (CPU) 101, Random Access Memory (RAM) 102 and any other a storage medium (e.g., hard disk drive, solid state drive, flash memory, cloud storage), a motherboard 103 for mounting and interconnecting electronic devices and elements, an operating system (OS) 104, one or more application software 105 written in one or more programming languages, a display element 106 such as a monitor or screen, and one or more input/output (I/O) devices or means 107, such as a mouse, touchscreen, touchpad, etc. Examples of computing devices usable with embodiments of the present invention include, but are not limited to, personal computers, smartphones, laptops, mobile computing devices, tablet PCs and servers. The term 'computing device' may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

The present invention may be implemented in the form of a computer program or software running on any known type of hardware. Traditionally, a computer program consists of a finite sequence of computational instructions or program instructions. It will be appreciated that a programmable apparatus (i.e., computing device) can receive such a computer program and, by processing the computational instructions thereof, produce a further technical effect.

The present invention may also be implemented by a programmable apparatus. A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium, such as a non-transitory storage medium implemented in physical devices, and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, a non-transitory electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions such as those required to operate the software component of the present invention can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is a transitory or intangible computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Python, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

Figure 2:
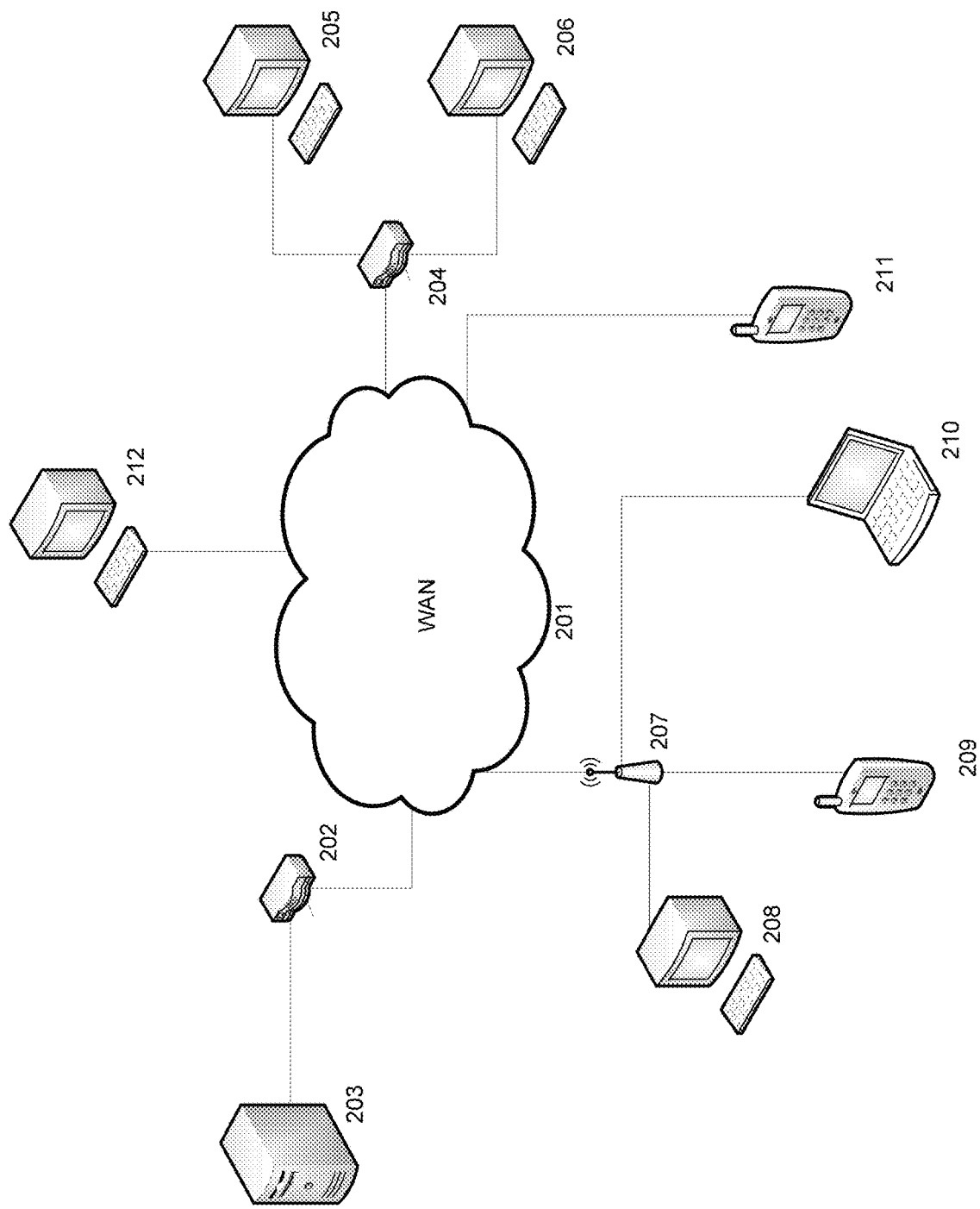
FIG. 2 illustrates a schematic overview of a network, in accordance with embodiments of the present invention.

Referring to FIG. 2, a schematic overview of a network-based system in accordance with an embodiment of the present invention is shown, implementing, for example, a cloud-based system. The network-based system is comprised of a communications network 201 interconnecting one or more application servers 203 for electronically storing and processing information and software used by the system. Applications in the application server 203 may retrieve and manipulate information in storage devices and exchange information through the Network 201 (e.g., the Internet, a Wide Area Network (WAN), a Local Area Network (LAN), WiFi, Bluetooth, etc.). Applications in server 203 may also be used to manipulate information stored remotely and process and analyze data stored remotely across a Network 201 (e.g., the Internet, a WAN, a LAN, WiFi, Bluetooth, etc.).

According to an exemplary embodiment, as shown in FIG. 2, exchange of information through the Network 201 may occur through one or more high speed connections. High speed connections may be over-the-air (OTA), passed through networked systems, directly connected to one or more Networks 201 or directed through one or more routers 202. Router(s) 202 are completely optional and other embodiments in accordance with the present invention may or may not utilize one or more routers 202. One of ordinary skill in the art would appreciate that there are numerous ways by which server 203 may connect to Network 201 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 203 via Network 201 or other networks in numerous ways. For instance, a component may connect to the system i) through a computing device 212 directly connected to the Network 201, ii) through a computing device 205, 206 connected to the Network 201 through a routing device 204, iii) through a computing device 208, 209, 210 connected to a wireless access point 207 or iv) through a computing device 211 via a wireless connection (e.g., CDMA, GMS, 3G, 4G) to the Network 201. One of ordinary skill in the art would appreciate that there are numerous ways that a component may connect to server 203 via Network 201, and embodiments of the present invention are contemplated for use with any method for connecting to server 203 via Network 201. Furthermore, server 203 could be comprised of a personal computing device, such as a smartphone, acting as a host for other computing devices to connect to.

An exemplary embodiment of the present invention comprises a computing device configured with a display and keyboard or a means for inputting text. In another exemplary embodiment, the computing device further comprises an eye tracker, which may be a camera or similar sensor capable of detecting and tracking eye movement. In yet another exemplary embodiment, the present invention comprises a microphone. Certain exemplary embodiments of the system of the present invention further comprise a means for connecting to a WAN or other network as described above. The system is comprised of a literacy detection module, which operates contemporaneously with other programs and applications, such as a word processor, web browser, messenger, or distance learning application. The literacy detection module detects and records the user's reading or writing behavior.

All embodiments of this invention are capable of observing reading behavior, using one of three possible methods. In the embodiment with the microphone, reading behavior is oral, i.e., aloud; whereas the other embodiments capture silent reading. In the exemplary embodiment of the present invention comprising the optional eye tracker, the literacy detection module, operating simultaneously with applications and programs, detects a user's eye movements as the user reads text displayed on the display means of the computing device. Notably, the user's eye movements reveal reading behavior. In this configuration, reading fluency is analyzed in terms of visual behavior which the system processes as a series of rapid eye movements, consisting of fixations and saccades. The literacy detection module would identify when a) a text is displayed and b) substantial linear motion of the user's visual focus (e.g. left-to-right, right-to-left, or vertically depending on the language or writing system of the displayed text). Thus, as the reading behavior is operationalized as a recorded sequential pattern of eye movements and fixations, a user's reading fluency is measured by the latency of this visual behavior as a user's eyes follow a line of text. This visual data is stored and subsequently analyzed by the literacy detection module to provide an assessment of the user's basic reading skill.

In the embodiment of the present invention that does not contain an eye tracker, the literacy detection module of the system relies on other (non-visual) behaviors to detect and define reading behavior. In order to identify the focus of a user's reading behavior by various methods, the system utilizes a 'moving window' paradigm. In terms of basic functionality, the moving window may embolden, highlight, or enlarge certain portions of the text, in order to distinguish it from the surrounding text. Alternatively, a certain portion of the text may be brought into focus (made more visible) while the remainder is blurred (or made less visible). One of ordinary skill in the art will appreciate that many different methods may be used to implement a moving window. According to this embodiment, as the user reads, the user may move on to the next portion of the text by interacting with an input means of the computing device (e.g. pressing a button on a keyboard, clicking a mouse, pressing a button on a portable computing device, touching a touchscreen of a computing device, or speaking a command) at which point the literacy detection module of the system would cause the next portion of the text to become highlighted or otherwise set off from the remaining text. As the user reads the text and moves from one portion of it to the next, the system records the time spent on each text portion. Consequently, from this moving window data, the system calculates the user's reading behavior, such as fluency and time on-task.

The embodiment of the invention described above can be seamlessly integrated into activities already being regularly performed by the user on the computing device. Consequently, the system would provide a less time consuming, more efficient method of literacy assessment, relative to traditional methods.

In addition to assessing reading fluency, the preferred embodiment of the present invention can also provide automated assessment of writing fluency. Many commonly-used computer or mobile applications involve writing, which involve the inputting of text into the computing device. While the following description focuses on the embodiment of the invention incorporating a keyboard as an input means, it should be understood that other embodiments contemplated by the invention may incorporate other input means including, but not limited to, touch-screen, voice dictation, or handwriting recognition. While simultaneously operating with other programs or applications running on the computing device, the literacy detection module of the preferred embodiment of the present invention detects the input of text. According to the preferred embodiment, the system analyzes the latency of the user's keystrokes in order to calculate writing fluency. As the user types, forming words and sentences, text production and input typically occurs in 'bursts' consisting of sequences of letter combinations. These bursts reflect the user's writing fluency in terms of length (i.e. number of letters per burst) and speed (i.e. burst latency—the duration of time per burst). Therefore as the user inputs text into the other simultaneously running apps or programs, the system collects and records the burst data which is then analyzed by the literacy detection module of the preferred embodiment of the invention to provide an automated assessment of the user's writing fluency. The bursts of text input by handwriting or voice recognition can be analyzed in an analogous manner.

Figure 3:
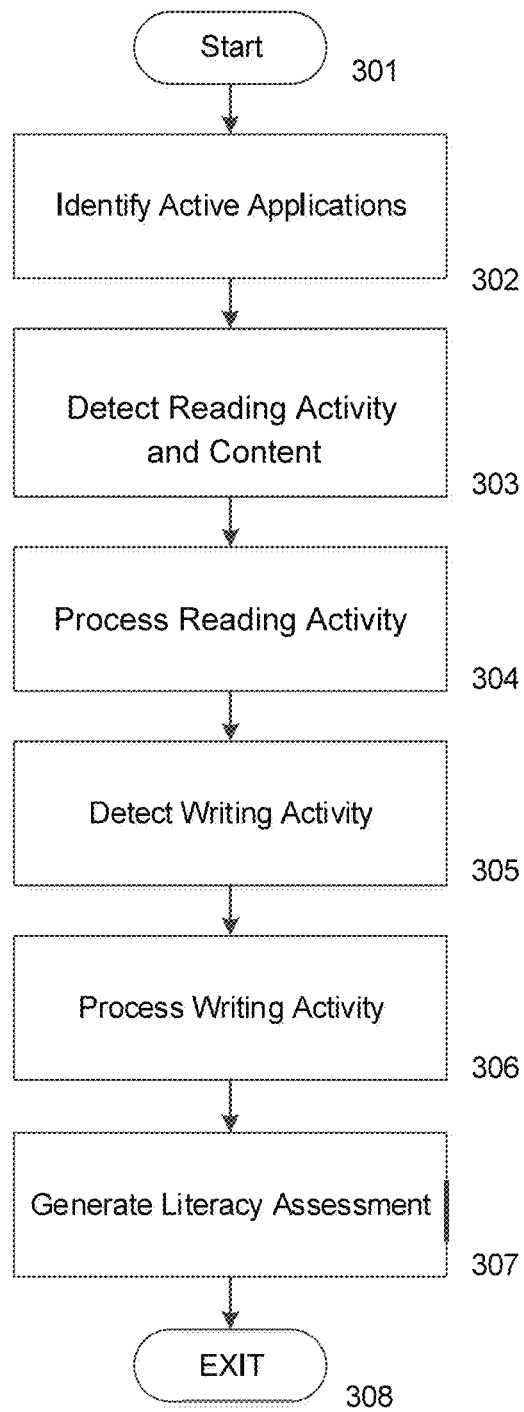
FIG. 3 illustrates a process flow of an exemplary method for automatically assessing a user's literacy skills.

FIG. 3 shows an exemplary method for automated literacy assessment, in accordance with an embodiment of the present invention. In this method, the process starts at step 301 with the system being engaged for use in assessing the literacy skills of a user, for example, by the user activating a predetermined computer program implementing the system. At step 302, the system identifies active applications being used by the system in order to determine which applications contain literacy-related content, i.e., the presence of ASCII text (one paragraph or longer) or a text editor. These applications may include web browsers, electronic book reader applications, word processor applications, or any combination thereof. One of ordinary skill in the art would appreciate that there are numerous types of applications that could be utilized to assess the literacy skills of a user.

At step 303, the system proceeds to detect reading activity including content in one or more of the identified applications. In preferred embodiments, the system may be configured to focus primarily on active applications (e.g., applications currently in the foreground or otherwise having the current focus of the user). Detection of reading activity and content can be through processing of raw text or data from the application, such as, but not limited to, data received from a HTTP_Request in a web browser, data received from an eBook file or other electronic document file, data received from a word processor file, or through optical character recognition (OCR) of characters and words in an application display (e.g., graphical user interface (GUI)).

At step 304, the system infers and processes reading activity which coincides with reading content. Inferring and processing of reading activity can be done in a few different ways, depending on the setup of the system. For instance, in embodiments where an eye tracker is available, the system can detect and process eye movements to identify reading speed across the already identified content. In the microphone-equipped embodiment, reading activity is aloud. In the keyboard-only embodiment, silent reading is captured via a moving window (described above).

Figure 4:
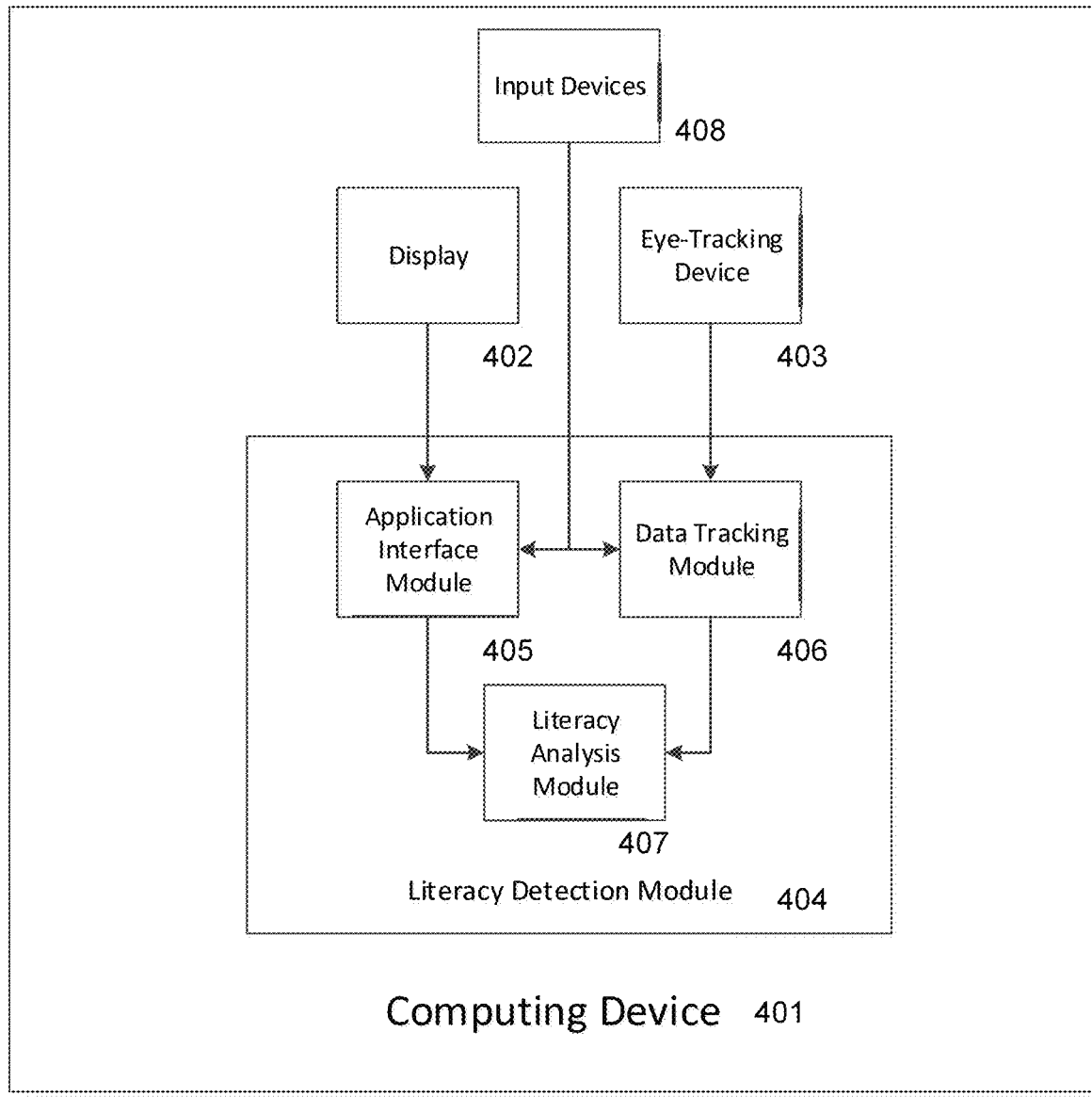
FIG. 4 illustrates a computing device for implementing automatic assessment of a user's literacy skills.
Figure 5:
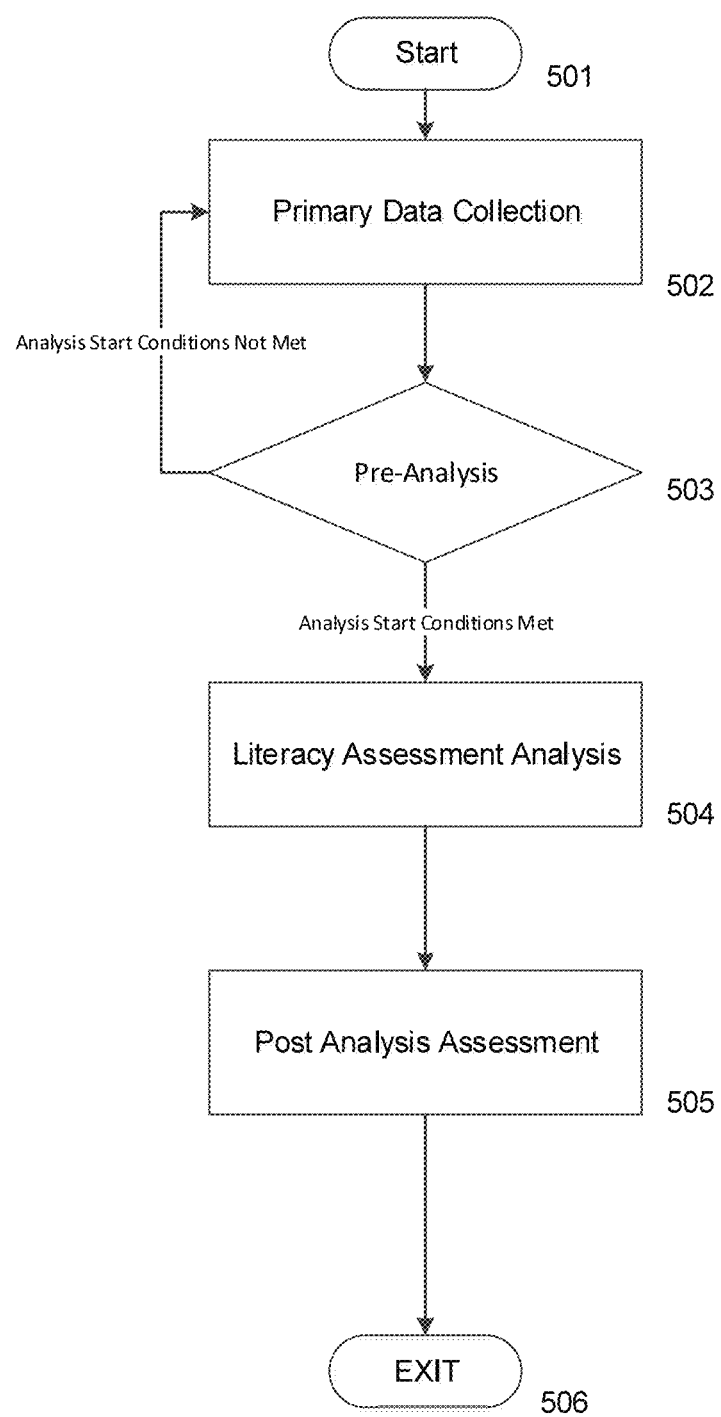
FIG. 5 illustrates a process flow for elements of the automated assessment system detailed herein and in the images provided.

At step 305, the system detects writing activity engaged in by a user, as described herein in connection with FIGS. 4-6. Writing activity can be detected via numerous means, such as key-presses on a keyboard or other implements (e.g., keypad display on a capacitive touch screen), a stylus on a capacitive display, or spoken dictation via speech recognition technology. One of ordinary skill in the art would appreciate that there are numerous methods for identifying writing activity, and embodiments of the present invention are contemplated for use with any appropriate means for identifying writing activity.

At step 306, the analysis of writing activity is performed, in order to measure/assess writing fluency. This analysis is described herein in connection with FIGS. 4-6, and optionally includes an evaluation of spelling accuracy. Most commonly, this spelling analysis may involve comparing words in the written output to words in a correctly-spelled lexicon. One of ordinary skill in the art would appreciate spelling accuracy might be measured a few different ways.

At step 307, the system generates a literacy assessment for the user, using the processes shown in FIGS. 6A and 6B, and described below. This literacy assessment is based upon the system's analysis of the user's reading activity and writing activity. In a preferred embodiment of the present invention, the system will generate scores for "Fluency," in terms of the total number of words processed (i.e., written or read) during the latency of a given session. Thus, fluency assessment will consist of measures of the number of words input per minute (for writing) or read per minute (for reading). Further assessments may include measures of "Practice" (based upon time on-task), "Vocabulary" (based upon vocabulary in reading texts such as those listed in the U.S. Common Core Tier standard), and/or "Spelling" (based on the percentage of words spelled correctly, perhaps weighted by the relative difficulty of the words produced). In certain embodiments, the system will only process one or the other, reading or writing. In other embodiments, the system may produce individual scores, collective scores or both. The system may be configured to compare a user's literacy scores to standardized models, such as a grade level (e.g., K-12). At this point the process ends at step 308, with the providing of relevant information related to the literacy assessment to an end point, such as a data store for concurrent or later access by other users, such as teachers, as well as perhaps parents and students. The end point could be, for instance, the user, via a graphical user interface (GUI), a centralized system (remote, distributed or local) for determining and maintaining records related to the literacy levels of users, or another local, remote or distributed computing device for retaining such data. One of ordinary skill in the art would appreciate that there are numerous end points and usage cases for such information, and embodiments of the present invention are contemplated for use with any appropriate end point.

FIG. 4 depicts an exemplary embodiment of the present invention configured as computing device 401 with a display 402 and eye-tracking device 403. The literacy detection module 404 is implemented on a computing device with an integrated eye-tracking device 403. In some embodiments of the present invention, the eye-tracking device 403 comprises not only a camera, but other sensing devices as well, such as an infra-red illuminator and sensor, or other devices appropriate for the accurate and precise detection and tracking of eye motions, as will be apparent to one skilled in the art. The eye-tracking device 403 can be mounted internally or externally depending on the nature of the device. In embodiments of the present invention, the computing device can be configured with input devices 408 for accepting user commands such as a keyboard, mouse, capacitive or resistive touch screen, trackpad, stylus, or other device as will be apparent to one of ordinary skill in the art, such as a microphone for receiving audio, sounds, or voice activities of the user, to be processed by a processor, such as the CPU 101, using speech-recognition software. The literacy detection module 404 further comprises an application interface module 405, a data tracking module 406, and a literacy analysis module 407. The application interface module 405 is configured to generate a visual map of the system's display area by identifying applications relevant to literacy analysis as described above, the size and location of each application window visible on the display at any given time, the characteristics of the text within any application (such as the language and writing system, the number of lines, spacing, and font size) as well as the dimensions and attributes of the system's display, and is further configured to track application changes and user inputs and commands that may alter the text displayed within an application. The data tracking module 406 receives and processes eye activity data via the eye-tracking device 403. The activity recorded includes the location and duration of eye fixations and saccade patterns. In some embodiments of the present invention, the eye-tracking device 403 further collects calibration information, such as the distance from a user's eyes to the display 402, facial positioning, and other dimensional data. The literacy analysis module 407 receives data from the application interface module 405 and data tracking module 406 to perform a reading literacy assessment of a user.

Reading Assessment

FIG. 5 shows an exemplary process for assessing reading literacy as implemented on an embodiment of the invention as described in FIG. 4. After the process initializes at step 501, the application interface module 405 generates a visual map. At step 502, the system begins the collection of primary data: the application interface module 405 records application data and manual user input, and the data tracking module 406 begins continuous recording of eye activity data via the eye-tracking device 403. At step 503, the system begins pre-analysis of the collected data, as described in step 1 of FIG. 6A. The literacy analysis module 407 matches the location of eye fixations with application data from the visual map to determine which application is active and has the user's attention. Next, the literacy analysis module 407 determines if the analysis start conditions are met in step 503; if not, the process loops back to step 502, but if the conditions are met in step 503, the process proceeds to step 504. In one embodiment of the present invention, the analysis start conditions are met if (1) the active application contains text and is appropriate for literacy assessment, and (2) the sequence of recorded eye activity shows linear motion in a pattern corresponding to the application language and writing system used, indicating that reading activity is taking place. At step 504, if the analysis start conditions are met, the literacy analysis module 407 begins literacy assessment analysis concurrent with the user's reading activity, as described in step 2 of FIG. 6A. The system records reading latency data: the time it takes for the user's eyes to move across each complete line of text, as well as the time intervals during which the user's eyes backtrack across the text, or the duration and location of any pauses in eye motion. The system also records when the user's visual activity shifts to a new line of text. The collected visual activity data also allows the system to identify when the user backtracks to a specific line of text which has already been read. If the text in the active application has changed, such as through user interaction, scrolling and page switching events, or other events or interactions resulting in the refreshing of displayed content within the application, the application interface module adjusts the visual map accordingly, the literacy analysis module identifies new lines of text, and recalibrates prior visual location data with the updated visual map. Any eye activity data associated with text no longer visible is stored for further analysis. Once sufficient data has been collected in step 504, or if initiated by the user or automatically by the system, the literacy analysis module 407 initializes post-analysis assessment of the collected data at step 505, as described in step 3 of FIG. 6A. In some embodiments of the invention, the system will also automatically initialize step 505 if the user exits or ends the active application. By matching the accumulated eye tracking data with the updated visual map data, the literacy analysis module identifies the amount of time the user spent reading any particular segment of text, as well as particular words that caused the user to pause, the number of pauses and backtracks, or any other visual activity patterns in relation to the text which are relevant to the literacy assessment analysis. The literacy analysis module 407 analyzes this data to determine if the user had difficulty with a segment of text or particular words, and is further configured to perform any of the assessment and scoring methods described earlier at step 307. In some embodiments of the invention, the analysis results can be incorporated into the user's performance profile and compared to the user's overall performance to identify problem areas that require further improvement. Once the post-analysis assessment is complete in step 505, the results are stored or outputted to an appropriate destination such as an end point, as described herein, and the process can either proceed to step 506 and end, or can restart at step 501.

In an alternate embodiment of the present invention, the system as described in FIG. 4 is configured to detect reading activity based on the user's inputted commands, instead of, or in combination with, eye-tracking data. The application interface module 405, upon identifying the relevant passage of text in the active application, is further configured to display a moving window within the active application which draws the user's attention to the beginning of the text passage and signals the user that the system is ready to begin reading literacy assessment. The moving window can be implemented by means of a plugin integrated within a word processor, web browser, document reader, or other text editor, by means of a separate application that creates a graphical overlay over the active application, or other method which would be apparent to one skilled in the art. The moving window marks a segment of text, such as a line or a sentence, by increasing its visibility. In a preferred embodiment of the present invention, the text is marked by highlighting, enlarging, emboldening, or otherwise isolating the selected text segment within a boundary. In one embodiment, the moving window can be implemented as a separate text viewer in full screen or windowed mode, in which the selected segment is displayed in isolation in the center of the window. The application interface module 405 is further configured to receive a user command, from the input devices 408, to advance the window to display the next text segment, or backtrack to a previous segment. In some embodiments, individual words within the selected text segment are marked, and the user can advance or backtrack by word rather than by segment, with the window advancing only when the last word in the segment is read. The data tracking module 406 is configured to receive user commands to advance or backtrack, and is further configured to record the latency data associated with each text segment (such as the time when a text segment is first marked within a window, and the time the user advances or backtracks the window or words within the window).

In an exemplary process implemented on a system employing a moving window as described above, the literacy analysis module 407 is further configured to record and analyze the latency data associated with each text segment and the progression of the moving window through the text, in place of the eye-tracking data combined with a visual map. In this embodiment, for the literacy analysis module 407 to begin pre-analysis, the analysis start conditions are met at step 503 in FIG. 5 if (1) the moving window contains text suitable for assessing reading literacy, and (2) the user begins to advance the window.

In some embodiments of the present invention, the use of the moving window to mark segments of text can be combined with the eye-tracking process described above. Eye-tracking data can be used to determine the reading latency of text within a moving window. Furthermore, using the moving window to mark text can greatly improve the accuracy of the visual map by drawing the eye to a fixed calibration point.

Alternatively, the user's speech could be inputted through the input device 408, i.e., via microphone, to conduct reading of the relevant passage of text in the active application. In this embodiment, the system includes speech recognition software operably coupled with the application interface module 405 and data tracking module 406. The system of the present invention processes the user's speech to assess fluency, time-on-task, vocabulary and accuracy of words spoken. Speech recognition could be used alone or in combination with the eye-tracking device described above. In another example, speech recognition is used to assess reading literacy of vision-impaired users. The relevant passage of text is in the form of pre-determined Braille patterns configured with the system. The user reads the text orally and is inputted for assessment.

Writing Assessment

Figure 6A:
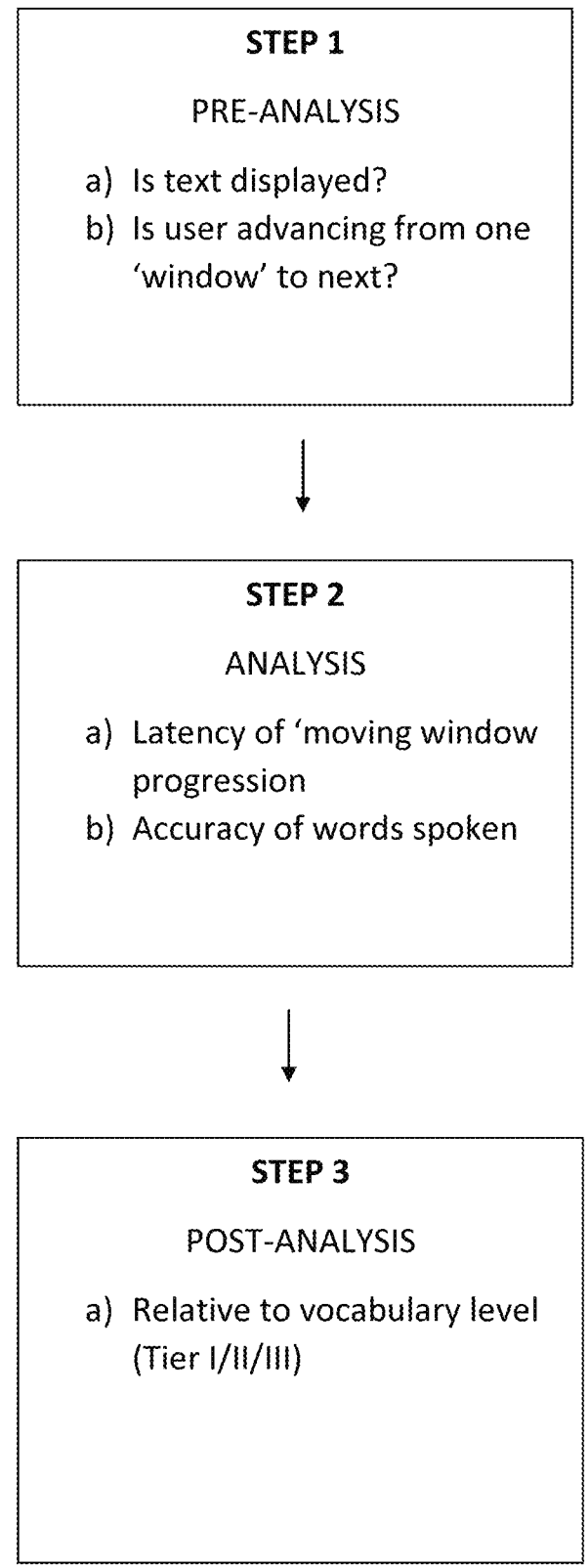
FIG. 6A illustrates a process flow for automatically assessing a user's fluency in reading.
Figure 6B:
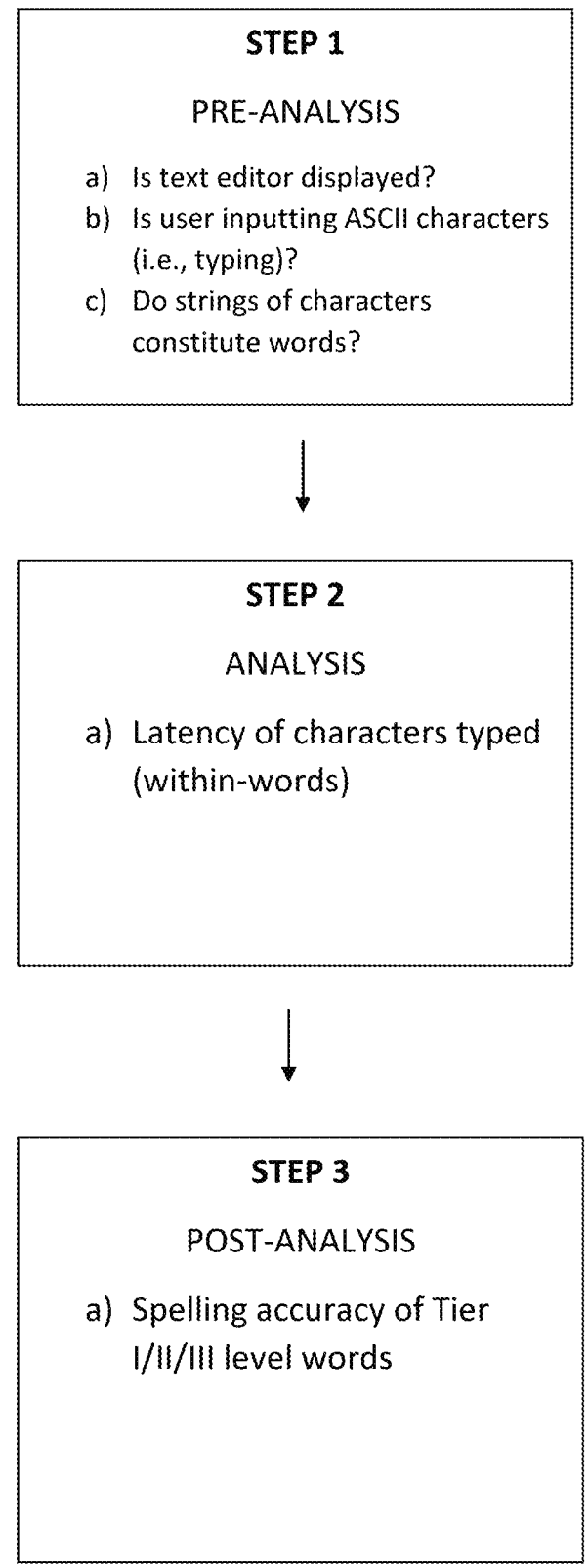
FIG. 6B illustrates a process flow for automatically assessing a user's fluency in writing.

In accordance with an embodiment of the present invention, the system as described in FIG. 4, in conjunction with FIGS. 5 and 6B, can be configured to assess the writing fluency of a user. In this embodiment, the eye-tracking device 403 is an optional component. The application interface module 405 is configured to recognize when a user is interacting with an active application containing an editable text field, and can be further configured to distinguish between an editable text field and an incidental text input field which is not relevant to the writing fluency assessment, such as a browser address bar, dialog boxes, or other input fields for the entry of commands and short phrases. The data tracking module 406 is configured to receive and process input data from one or more input devices 408, such as key presses, handwriting strokes, and spoken dictation. Further, it is configured to convert inputted raw string data or handwriting data into character encoded text. The literacy analysis module 407 receives data from the application interface module 405 and the data tracking module 406 to perform a writing fluency assessment of the user.

In an embodiment of the present invention, the process as described in FIG. 5 is adapted to assess a user's writing fluency. At step 501, the process initializes, and the application interface module 405 identifies active applications with any editable text fields. At step 502, the system begins the collection of primary data. The data tracking module receives inputted text data from one or more input devices 406, and begins recording the inputted text data in a time marked sequence. In a preferred embodiment of the present invention, the data tracking module 406 also receives contextual data from the application interface module 405 detailing where this text data was inputted, the time when text is first inputted into a particular editable text field, the time each character is inputted, and the time of occurrence of any stop events. The text data is inputted using, for example, an editable text field. The time when text is first inputted is also known as character latency. The time of occurrence of stop events includes, for example, time of the last inputted character after which no text data is received for a set period of time, when the current editable text field becomes inactive, when the user switches to a different application, or any other end condition.

Next, pre-analysis of the received primary data occurs at step 503, as described in step 1 of FIG. 6B. The literacy analysis module 407 analyses the primary data collected at step 502 to determine if the inputted text data is relevant for writing fluency assessment analysis. In a preferred embodiment, the start conditions are met and analysis can begin if (1) the inputted text data is being entered into an editable text field, and (2) the characters in the inputted text data constitute words (or sequences of alphabetical characters as opposed to non-verbal commands). If the start conditions are met, the system initiates the writing fluency analysis at step 504, as described in step 2 of FIG. 6B. The literacy analysis module 407 uses the collected primary data to assess the speed of the user's text input. In a preferred embodiment of the present invention, the system records the time text input begins, and then the inputted text data is analyzed and grouped into discrete sentences or phrases. This analysis can be performed concurrently while text is inputted, or can be performed once text input has ended. The system then analyzes the latency data associated with each character to determine the burst latency for each word and sentence entered. Latency can be measured as the time a character was inputted (by recording the system timestamp), or as the amount of time delay between a time marker, such as the time the user first began inputting a sentence or word, and the entry of a particular character. This allows the system to calculate burst latency (the duration of time required to input all the characters constituting a burst) and burst length. A 'burst' may be operationalized in various ways, whether at the character, word, sentence, or paragraph levels. Once the system records sufficient burst data, the literacy analysis module 407 can begin writing fluency post analysis assessment at step 505, as described in step 3 of FIG. 6B, to calculate the user's writing fluency in terms of speed, vocabulary, spelling accuracy, and other factors as would be apparent to one of ordinary skill in the art. In addition, the detailed latency data allows the system to identify problematic words and phrases based on high burst latency and/or spelling, grammatical, and other errors. Writing fluency assessments can be performed on individual bursts, combinations of bursts, or can be averaged across all bursts collected in any given writing session. In some embodiments of the present invention, the analysis results can be incorporated into the user's performance profile and compared to the user's overall performance to identify problem areas that require further improvement. Once the post-analysis assessment is complete, the results are stored or outputted to an appropriate destination, such as an end point described herein, and the process can either proceed to step 506 and end, or can restart at step 501.

Literacy Measures

As shown in FIGS. 6A and 6B, the overall literacy progress tracker of the present invention is implemented on a system such as a desktop personal computer executing a predetermined computer program for performing multiple measures of literacy skills in reading and writing, as described above in connection with FIGS. 3-5. For reading, fluency is measured by a latency of in a moving window and progression, for example, in words per minute, while time on-task is measured by total latency of reading behavior, for example, in the number of words read, and vocabulary is measured by a percentage of a set of words defined correctly. The set of words may be drawn from the U.S. Common Core standards. These standards describe a progression of vocabulary learning, with lists of words typically learned from earlier to later grades (i.e., Tier 1, Tier 2, & Tier 3). However, for writing, fluency is measured by words produced per minute, whether input by keyboard or another method. This fluency measure is calculated by using an appropriate statistic of central tendency, such as the mean average across bursts. Time on-task is measured by a total latency of writing behavior in minutes. Spelling is measured as the percentage of Tier I/II/III words spelled correctly.

Referring again to FIG. 6A in conjunction with FIGS. 3-5, for reading assessment, in Step 1 for pre-analysis in step 503 in FIG. 5, the process determines if reading is occurring, such as if text is displayed and/or is the user advancing from one window to the next. In Step 2 for analysis in step 504 in FIG. 5, the process then measures user behavior in terms of latency of the progression of the moving window. In Step 3 for post-analysis in step 505 in FIG. 5, the process adjusts for vocabulary difficulty by setting the reading levels relative to the vocabulary level according to the current tier of Tiers I/II/III.

Referring again to FIG. 6B in conjunction with FIGS. 3-5, for writing assessment, in Step 1 in FIG. 6B, for pre-analysis in step 503 in FIG. 5, the process determines if writing is occurring, such as if a text editor is displayed, whether the user is inputting characters, such as ASCII characters by typing, and/or whether strings of characters are being input which constitute words. In Step 2 in FIG. 6B, for analysis in step 504 in FIG. 5, the process then measures the behavior in terms of latency of words input, whether characters typed (via keyboard) or words dictated (via speech recognition). In Step 3 in FIG. 6B, for post-analysis in step 505 in FIG. 5, the process determines spelling accuracy of words being input relative to the vocabulary level according to the current tier of Tiers I/II/III.

CONCLUSION

As described above, the present invention is a system and method for automatically assessing a user's basic literacy skills. During ordinary literacy-related activities on the Web, involving reading and/or writing, the system and method monitors, records, and analyzes information about literacy-related behaviors, involving reading or writing. After analysis, the system produces assessment results about the development of users' basic reading and writing skills, including fluency, time on-task, and spelling/vocabulary. This invention may be particularly useful for classroom teachers, by providing a convenient view real-time view of each student's literacy development.

The system and method of the invention allow user-data to be accessed by various stakeholders, including parents and students; instructors; and/or educational institution administrators. For example, the system, via the abovementioned network or internet connection, may provide access to the automated assessment data to a teacher for instructional purposes or to a school or government official for a view of student achievement.

In the description above, the claims below, and in the accompanying drawings, reference is made to particular features (including method steps) of the various embodiments of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

One of ordinary skill in the art would also recognize that the present invention could be implemented in different languages. Thus, the present invention is not limited to application to the English language.

While multiple embodiments are disclosed, still other embodiments of the present invention will become apparent to those skilled in the art from this detailed description. There may be aspects of this invention that may be practiced without the implementation of some features as they are described. It should be understood that some details have not been described in detail in order to not unnecessarily obscure focus of the invention. The invention is capable of myriad modifications in various obvious aspects, all without departing from the spirit and scope of the present invention. Accordingly, the drawings and descriptions are to be regarded as illustrative in nature and not restrictive.

Insofar as the description above and the accompanying drawings disclose any additional subject matter that is not within the scope of the claims below, the inventions are not dedicated to the public and the right to file one or more applications to claim such additional inventions is reserved.

The invention claimed is:

1. A system for providing automated literacy assessment comprising:
    an input device for receiving data involving literacy-related activities of a user, wherein the received data is obtained by progress monitoring the user instead of utilizing text items;
    a processor for executing a predetermined literacy assessment program for implementing:
        a pre-analysis module for performing pre-analysis of the received data;
        an analysis module for performing a literacy assessment analysis on the pre-analyzed data; and
        a post-analysis module for performing, using the processor, post-analysis assessment of the results of the literacy assessment analysis; and
    an output device for outputting the post-analysis assessment assessing the literacy of the user.

2. The system of claim 1, wherein input device includes an eye-tracking device for tracking the eye movements of the user during the literacy-related activities; and
    wherein the processor executes an eye-tracking program to process the tracked eye movements of the user.

3. The system of claim 1, wherein the input device includes a microphone for receiving audio-based literacy-related activities of the user; and
    wherein the processor executes a speech-recognition program to process the receiving audio-based literacy-related activities of the user.

4. The system of claim 1, wherein the literacy-related activities of the user involve reading activities of the user.

5. The system of claim 1, wherein the literacy-related activities of the user involve writing activities of the user.

6. The system of claim 1, wherein the processor is operatively connected to at least one of the input device and the output device by a communication network.

7. The system of claim 1, wherein the output device is a display for displaying the post-analysis assessment assessing the literacy of the user.

8. A method for providing automated literacy assessment comprising:
- receiving, at an input device, data involving literacy-related activities of a user, wherein the received data is obtained by progress monitoring the user instead of utilizing text items;
- executing, by a processor, a predetermined literacy assessment program;
- performing pre-analysis of the received data by a pre-analysis module;
- performing a literacy assessment analysis on the pre-analyzed data by an analysis module;
- performing, using the processor, post-analysis assessment of the results of the literacy assessment analysis by a post-analysis module implemented by the processor; and
- outputting, at an output device, the post-analysis assessment assessing the literacy of the user.

9. The method of claim 8, further comprising tracking the eye movements of the user during the literacy-related activities using an eye-tracking device; and
- processing, using the processor, the tracked eye movements of the user.

10. The method of claim 8, further comprising receiving, at a microphone, audio-based literacy-related activities of the user; and
- performing, using the processor, speech-recognition to process the receiving audio-based literacy-related activities of the user.

11. The method of claim 8, wherein the literacy-related activities of the user involve reading activities of the user.

12. The method of claim 8, wherein the literacy-related activities of the user involve writing activities of the user.

13. The method of claim 8, further comprising:
- operatively connecting the processor to at least one of the input device and the output device by a communication network.

14. The method of claim 8, wherein the outputting includes displaying, on a display, the post-analysis assessment assessing the literacy of the user.

15. A non-transitory computer readable medium storing instructions, executable by a processor, for providing automated literacy assessment, the stored instructions implementing a method comprising:
- receiving, at an input device, data involving literacy-related activities of a user, wherein the received data is obtained by progress monitoring the user instead of utilizing text items;
- executing, by a processor, a predetermined literacy assessment program;
- performing pre-analysis of the received data by a pre-analysis module;
- performing a literacy assessment analysis on the pre-analyzed data by an analysis module;
- performing, using the processor, post-analysis assessment of the results of the literacy assessment analysis by a post-analysis module implemented by the processor; and
- outputting, at an output device, the post-analysis assessment assessing the literacy of the user.

16. The non-transitory computer readable medium of claim 15, further comprising tracking the eye movements of the user during the literacy-related activities using an eye-tracking device; and
- processing, using the processor, the tracked eye movements of the user.

17. The non-transitory computer readable medium of claim 15, further comprising receiving, at a microphone, audio-based literacy-related activities of the user; and
- performing, using the processor, speech-recognition to process the receiving audio-based literacy-related activities of the user.

18. The non-transitory computer readable medium of claim 15, wherein the literacy-related activities of the user involve reading activities of the user.

19. The non-transitory computer readable medium of claim 15, wherein the literacy-related activities of the user involve writing activities of the user.

20. The non-transitory computer readable medium of claim 15, further comprising:
- operatively connecting the processor to at least one of the input device and the output device by a communication network.

21. A system for providing automated literacy assessment comprising:
- an input device for receiving data involving reading-related activities of a user, wherein the received data is obtained by progress monitoring the user instead of utilizing text items;
- a processor for executing a predetermined literacy assessment program for performing a literacy assessment analysis on the reading-related data, including performing, using the processor, post-analysis assessment by a post-analysis module, implemented by the processor; and
- an output device for outputting the literacy assessment assessing the reading-related literacy of the user.

22. The system of claim 21, wherein input device includes an eye-tracking device for tracking the eye movements of the user during the reading-related activities; and
- wherein the processor executes an eye-tracking program to process the tracked eye movements of the user.

23. The system of claim 21, wherein the input device includes a microphone for receiving audio-based reading-related activities of the user; and
- wherein the processor executes a speech-recognition program to process the receiving audio-based reading-related activities of the user.

24. The system of claim 21, wherein the reading-related activities of the user involve reading of text by the user.

25. The system of claim 21, wherein the processor is operatively connected to at least one of the input device and the output device by a communication network.

26. The system of claim 21, wherein the output device is a display for displaying the assessment assessing the reading-related literacy of the user.

27. A method for providing automated literacy assessment comprising:
- receiving, at an input device, data involving reading-related activities of a user, wherein the received data is obtained by progress monitoring the user instead of utilizing text items;
- executing, by a processor, a predetermined literacy assessment program including a post-analysis module for performing, using the processor, post-analysis assessment;
- outputting, at an output device, the assessment assessing the reading-related literacy of the user.

28. The method of claim 27, further comprising tracking the eye movements of the user during the reading-related activities using an eye-tracking device; and
- processing, using the processor, the tracked eye movements of the user.

29. The method of claim 27, further comprising receiving, at a microphone, audio-based reading-related activities of the user; and
performing, using the processor, speech-recognition to process the receiving audio-based reading-related activities of the user.

30. The method of claim 27, wherein the literacy-related activities of the user involve reading of text by the user.

31. The method of claim 27, further comprising:
operatively connecting the processor to at least one of the input device and the output device by a communication network.

32. The method of claim 27, wherein the outputting includes displaying, on a display, the assessment assessing the reading-related literacy of the user.

33. A non-transitory computer readable medium storing instructions, executable by a processor, for providing automated literacy assessment, the stored instructions implementing a method comprising:
receiving, at an input device, data involving reading-related activities of a user, wherein the received data is obtained by progress monitoring the user instead of utilizing text items;
executing, by a processor, a predetermined literacy assessment program including a post-analysis module for performing, using the processor, post-analysis assessment; and
outputting, at an output device, the assessment assessing the reading-related literacy of the user.

34. The non-transitory computer readable medium of claim 33, further comprising tracking the eye movements of the user during the reading-related activities using an eye-tracking device; and
processing, using the processor, the tracked eye movements of the user.

35. The non-transitory computer readable medium of claim 33, further comprising receiving, at a microphone, audio-based reading-related activities of the user; and
performing, using the processor, speech-recognition to process the receiving audio-based reading-related activities of the user.

36. The non-transitory computer readable medium of claim 33, wherein the reading-related activities of the user involve reading text by the user.

37. The non-transitory computer readable medium of claim 33, further comprising:
operatively connecting the processor to at least one of the input device and the output device by a communication network.

38. A system for providing automated literacy assessment comprising:
an input device for receiving data involving writing-related activities of a user, wherein the received data is obtained by progress monitoring the user instead of utilizing text items;
a processor for executing a predetermined literacy assessment program for performing a literacy assessment analysis on the writing-related data, including performing, using the processor, post-analysis assessment by a post-analysis module implemented by the processor; and
an output device for outputting the literacy assessment assessing the writing-related literacy of the user.

39. The system of claim 38, wherein input device includes an eye-tracking device for tracking the eye movements of the user during the writing-related activities; and
wherein the processor executes an eye-tracking program to process the tracked eye movements of the user.

40. The system of claim 38, wherein the input device includes a microphone for receiving audio-based writing-related activities of the user; and
wherein the processor executes a speech-recognition program to process the receiving audio-based writing-related activities of the user.

41. The system of claim 38, wherein the writing-related activities of the user involve writing of text by text entry by the user.

42. The system of claim 38, wherein the processor is operatively connected to at least one of the input device and the output device by a communication network.

43. The system of claim 38, wherein the output device is a display for displaying the assessment assessing the writing-related literacy of the user.

44. A method for providing automated literacy assessment comprising:
receiving, at an input device, data involving writing-related activities of a user, wherein the received data is obtained by progress monitoring the user instead of utilizing text items;
executing, by a processor, a predetermined literacy assessment program, including a post-analysis module for performing, using the processor, post-analysis assessment;
outputting, at an output device, the assessment assessing the writing-related literacy of the user.

45. The method of claim 44, further comprising tracking the eye movements of the user during the writing-related activities using an eye-tracking device; and
processing, using the processor, the tracked eye movements of the user.

46. The method of claim 44, further comprising receiving, at a microphone, audio-based writing-related activities of the user; and
performing, using the processor, speech-recognition to process the receiving audio-based writing-related activities of the user.

47. The method of claim 44, wherein the literacy-related activities of the user involve writing of text by text entry by the user.

48. The method of claim 44, further comprising:
operatively connecting the processor to at least one of the input device and the output device by a communication network.

49. The method of claim 44, wherein the outputting includes displaying, on a display, the assessment assessing the writing-related literacy of the user.

50. A non-transitory computer readable medium storing instructions, executable by a processor, for providing automated literacy assessment, the stored instructions implementing a method comprising:
receiving, at an input device, data involving writing-related activities of a user, wherein the received data is obtained by progress monitoring the user instead of utilizing text items;
executing, by a processor, a predetermined literacy assessment program including a post-analysis module for performing, using the processor, post-analysis assessment; and
outputting, at an output device, the assessment assessing the writing-related literacy of the user.

51. The non-transitory computer readable medium of claim 50, further comprising tracking the eye movements of the user during the writing-related activities using an eye-tracking device; and processing, using the processor, the tracked eye movements of the user.

52. The non-transitory computer readable medium of claim 50, further comprising receiving, at a microphone, audio-based writing-related activities of the user; and performing, using the processor, speech-recognition to process the receiving audio-based writing-related activities of the user.

53. The non-transitory computer readable medium of claim 50, wherein the writing-related activities of the user involve writing text by text entry by the user.

54. The non-transitory computer readable medium of claim 50, further comprising:

operatively connecting the processor to at least one of the input device and the output device by a communication network.

55. The system of claim 1, wherein the literacy-related activities include both reading activities and writing activities of the user.

56. The system of claim 55, wherein the literacy assessment analysis includes automatically assessing a fluency in the reading activities and writing activities of the user.

57. The method of claim 8, wherein the literacy-related activities include both reading activities and writing activities of the user.

58. The method of claim 57, wherein the performing of the literacy assessment analysis includes automatically assessing a fluency in the reading activities and writing activities of the user.

59. The non-transitory computer readable medium of claim 15, wherein the literacy-related activities include both reading activities and writing activities of the user.

60. The non-transitory computer readable medium of claim 59, wherein the performing of the literacy assessment analysis includes automatically assessing a fluency in the reading activities and writing activities of the user.

* * * * *